(12) United States Patent
Zhang et al.

(10) Patent No.: US 9,255,667 B2
(45) Date of Patent: Feb. 9, 2016

(54) LED LIGHTING ASSEMBLY AND AN LED RETROFIT LAMP HAVING THE LED LIGHTING ASSEMBLY

(75) Inventors: Qihui Zhang, Shenzhen (CN); Yusheng Ming, Shenzhen (CN); Anmiao Li, Shenzhen (CN); Dirk Buchhauser, Shenzhen (CN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/236,344

(22) PCT Filed: Aug. 1, 2012

(86) PCT No.: PCT/EP2012/064994
§ 371 (c)(1),
(2), (4) Date: Apr. 4, 2014

(87) PCT Pub. No.: WO2013/017612
PCT Pub. Date: Feb. 7, 2013

(65) Prior Publication Data
US 2014/0210332 A1 Jul. 31, 2014

(30) Foreign Application Priority Data

Aug. 2, 2011 (CN) .......................... 2011 1 0219962

(51) Int. Cl.
*F21V 5/00* (2015.01)
*F21K 99/00* (2010.01)
(Continued)

(52) U.S. Cl.
CPC . *F21K 9/135* (2013.01); *F21K 9/52* (2013.01); *F21V 3/02* (2013.01); *F21V 17/101* (2013.01); *F21Y 2101/02* (2013.01); *F21Y 2103/022* (2013.01); *Y02B 20/383* (2013.01)

(58) Field of Classification Search
CPC .......... Y02B 20/383; F21V 3/02; F21K 9/135
USPC .......................................................... 313/46
See application file for complete search history.

(56) References Cited

U.S. PATENT DOCUMENTS 7,160,012 B2 * 1/2007 Hilscher et al. ............... 362/555
8,761,565 B1 * 6/2014 Coleman et al. ............... 385/146
(Continued)

FOREIGN PATENT DOCUMENTS

CN 201069137 Y 6/2008
JP 2011129388 A 6/2011
(Continued)

OTHER PUBLICATIONS

International Search Report of PCT/EP2012/064994 dated Jan. 22, 2013.
(Continued)

*Primary Examiner* — Thomas A Hollweg
*Assistant Examiner* — Christopher Raabe
(74) *Attorney, Agent, or Firm* — Viering, Jentschura & Partner

(57) ABSTRACT

An LED lighting assembly may include a printed circuit board with an LED chip, and a heat sink thermally conducted with the printed circuit board, wherein the LED lighting assembly further comprises a light guide body configured as a bulb, the light guide body having an end surface as a light incidence surface of light from the LED chip, an outer surface as a light emergent surface and an inner surface, wherein the inner surface is structured so as to form a reflecting surface, reflecting at least part of light from the end surface to the outer surface.

15 Claims, 6 Drawing Sheets

(51) Int. Cl.
  *F21V 3/02* (2006.01)
  *F21V 17/10* (2006.01)
  *F21Y 101/02* (2006.01)
  *F21Y 103/02* (2006.01)

(56) References Cited

U.S. PATENT DOCUMENTS

| | | | |
|---|---|---|---|
| 2010/0002425 A1 | 1/2010 | Tsai et al. | |
| 2010/0214764 A1* | 8/2010 | Chaves et al. | 362/84 |
| 2010/0320904 A1* | 12/2010 | Meir | 315/32 |
| 2011/0002125 A1* | 1/2011 | Hwang et al. | 362/294 |
| 2011/0101861 A1* | 5/2011 | Yoo | 315/35 |
| 2012/0139403 A1* | 6/2012 | Johnston et al. | 313/46 |
| 2013/0077285 A1* | 3/2013 | Isogai et al. | 362/84 |
| 2013/0257278 A1* | 10/2013 | DeVore et al. | 315/113 |

FOREIGN PATENT DOCUMENTS

| | | |
|---|---|---|
| KR | 2020080006566 U | 12/2008 |
| WO | 2012042843 A1 | 4/2012 |

OTHER PUBLICATIONS

Chinese Office Action based on Application No. 201110219962.2(7 Pages and 6 Pages of English translation) dated May 29, 2015.

* cited by examiner

LED LIGHTING ASSEMBLY AND AN LED RETROFIT LAMP HAVING THE LED LIGHTING ASSEMBLY

RELATED APPLICATIONS

The present application is a national stage entry according to 35 U.S.C. §371 of PCT application No.: PCT/EP2012/064994 filed on Aug. 1, 2012, which claims priority from Chinese application No.: 201110219962.2 filed on Aug. 2, 2011, and is incorporated herein by reference in its entirety.

TECHNICAL FIELD

Various embodiment relate to an LED lighting assembly. In addition, Various embodiment also relate to an LED retrofit lamp having the LED lighting assembly.

BACKGROUND

As everyone knows, LED illumination has irreplaceable advantages, such as energy saving, low power consumption, and electrical-to-optical conversion efficiency near to 100%. It can save more than 80% energy compared with the traditional light source with the same illuminating efficiency and has a longer service life. In view of the above advantages, the LED is more and more used as a light source such as a lot of LED retrofit lamps in the market. Such LED retrofit lamps have the same appearance and profile as the traditional light source such as incandescent lamp or lamp tube, thus they can be more applicable to the existing illuminating systems as a light source.

An LED retrofit lamp is disclosed in the prior art. The LED retrofit lamp has a lamp holder connected with a power supply a heat sink that has one end fixed on the lamp holder and the other end thermally contacting a printed circuit board carrying an LED chip, and a hemispherical bulb provided at the other end of the heat sink to enclose the printed circuit board carrying the LED chip. The heat sink of such LED retrofit lamp is configured to be hollow with an LED driver arranged therein for the LED chip. However, the light intensity distribution of such LED retrofit lamp is not quite uniform because the bulb used as a diffuser usually has a simple structure made from a glass or plastic, while such diffuser cannot distribute the light according to requirements and merely can slightly change the beam angle.

Another prominent shortcoming is a low inner space utilization ratio of such LED retrofit lamp. In the existing LED retrofit lamp, the LED chip usually should be arranged uniformly and symmetrically on the printed circuit board in order to distribute the light on various directions as uniformly as possible. In this situation, the printed circuit board divides the LED retrofit lamp into two parts, i.e. a heat sink part below the printed circuit board, and a bulb part over the printed circuit board. As the LED driver for driving the LED chip is arranged in the heat sink, and the inner space of the heat sink is limited, the volume of the LED driver is required to be reduced as small as possible. As everyone knows, reduction of the volume of the electronic device leads to notable increase of the cost, which obviously increases the cost of the LED retrofit lamp.

SUMMARY

Therefore, various embodiments provide an LED lighting assembly that is characterized by good light intensity distribution performance, high inner space utilization ratio and simple structure, and is easily manufactured. In addition, various embodiments provide an LED retrofit lamp having the LED lighting assembly of the type above.

According to various embodiments, the LED lighting assembly has a printed circuit board with an LED chip, a heat sink thermally conducted with the printed circuit board, wherein the LED lighting assembly further comprises a light guide body configured as a bulb, the light guide body having an end surface as a light input coupling surface of light from the LED chip, an outer surface as a light emergent surface and an inner surface, and wherein the inner surface is structured so as to form a reflecting surface reflecting at least part of light from the end surface to the outer surface. In the LED lighting assembly according to the present disclosure, the bulb is configured as the light guide body, after the light goes into between the inner and outer surfaces of the bulb from the end surface, it is reflected by the reflecting surface which then changes an emergent angle of the light and enables the light intensity distribution of the light to be more uniform on the light emergent surface of the whole bulb.

According to various embodiments, a plurality of annular grooves is provided on the inner surface. The annular grooves are spaced apart in a direction from the end surface to a top of the bulb. With the configuration of the annular grooves on the inner surface, reflecting surfaces facing to the light emergent surface are formed on the inner surface, so that an emergent angle and light intensity distribution of the light are adjusted using the reflecting surfaces.

Preferably, a cross section of the annular groove is in a V shape, and the reflecting surface is defined by two groove side surfaces of the V shape-annular groove, wherein the reflecting surface faces to the outer surface. The light coming from the end surface projects onto the reflecting surface constructed by the groove side surfaces in a V shape and is reflected to an expected direction.

Further preferably, a plane defined by each annular groove is parallel to a plane defined by the end surface. Such configuration of the annular groove provides an arrangement rotationally symmetrical in relation to an optical axis so that the LED lighting assembly according to the present disclosure obtains illumination rotationally symmetrical in relation to the optical axis.

According to various embodiments, the end surface is supported on the printed circuit board, and is provided with an accommodating recess in which the LED chip is received. As the LED chip is often arranged to protrude from the printed circuit board, the arrangement of the accommodating recess on the end surface can well receive the LED chip therein so as to make the assembling easier with a pleasing appearance and a compact structure.

According to various embodiments, an interval between the annular grooves in a direction from the end surface to the top of the bulb gradually becomes smaller. As the distance from the annular groove to the LED chip becomes bigger, the interval between the annular grooves gradually gets smaller, which is favorable for obtaining a uniform light intensity distribution.

Preferably, an angle between two groove side surfaces of each annular groove is in a range of 60° to 120°. Further preferably, the bulb is divided in the direction from the end surface to the top of the bulb into a bottom area, a middle area and a top area, wherein an angle between two groove side surfaces of the annular groove in the bottom area, middle area and top area is 120°-110°, 110°-80°, and 80°-60°, respectively. As the distance from the annular groove to the LED chip gets bigger, the angle between two groove side surfaces of each annular groove gets smaller, so as to obtain a predetermined illuminating angle range by selecting different angle ranges.

According to various embodiments, the LED lighting assembly further has an additional reflecting cover neighboring the inner surface in an inner side of the bulb. The light from the LED chip cannot be completely reflected by the reflecting surfaces and goes through the light emergent surface, but part of the light may pass through the inner surface to go into an inside of the bulb, thus the additional reflecting cover is provided in the inside of the bulb to reflect this part of light out of the bulb so as to reduce light loss as small as possible.

According to various embodiments, the printed circuit board has an excavated central region and a peripheral region arranged with the LED chip. Preferably, the heat sink is provided with a hollow region communicated with the central region of the printed circuit board. Thus, the bulb and the heat sink jointly define a relatively big installation space to accommodate electronic devices such as LED driver. This prominently increases an inner installation space of an LED electronic assembly, improves a space utilization ratio thereof, and there is no need to make a compromise on the size of the electronic devices such as LED driver because of a crowded inner installation space.

According to various embodiments, the bulb is configured to be a hemispherical shape with a cavity or a hollow column, cube, pyramid or cone.

Advantageously, the bulb consists of two, four or six sub bulbs equally divided on a circumference thereof, and these sub bulbs are bonded or welded together. This extremely simplifies the manufacturing difficulty of the bulb, and greatly reduces the assembling difficulty of the LED lighting assembly according to the present disclosure.

Preferably, the bulb is made from a glass or a plastic. Of course, the bulb also may be made from other transparent or semi-transparent materials suitable as a bulb.

According to various embodiments, the LED retrofit lamp has a lamp holder and the LED lighting assembly as described above, wherein the lamp holder is fixed on the heat sink of the LED lighting assembly to connect the LED lighting assembly to the power supply. Such LED retrofit lamp is characterized by good light intensity distribution performance, a high inner space utilization ratio and simple structure, and is easily manufactured.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
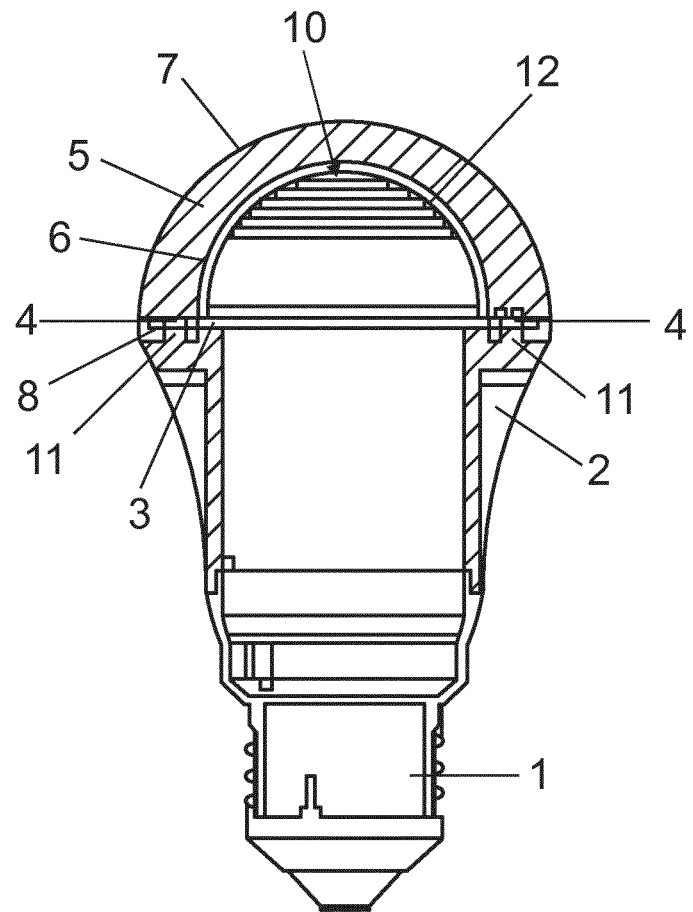
FIG. 1 is a sectional view of an LED retrofit lamp according to the present disclosure.
Figure 5A:
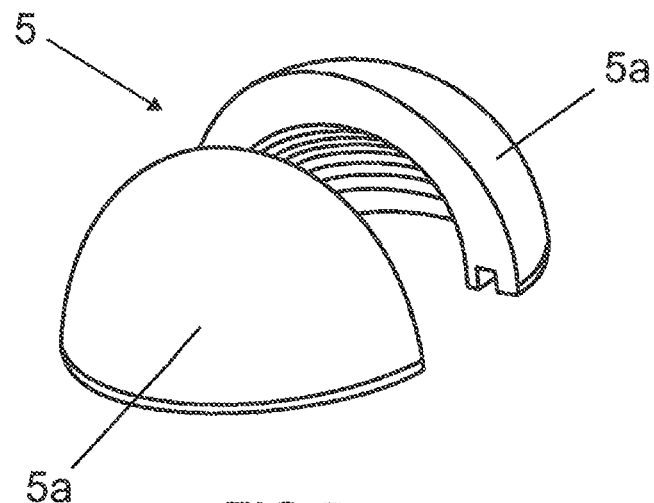
FIG. 5A-FIG. 5B are sectional views of alternative embodiments of a bulb.
Figure 5B:
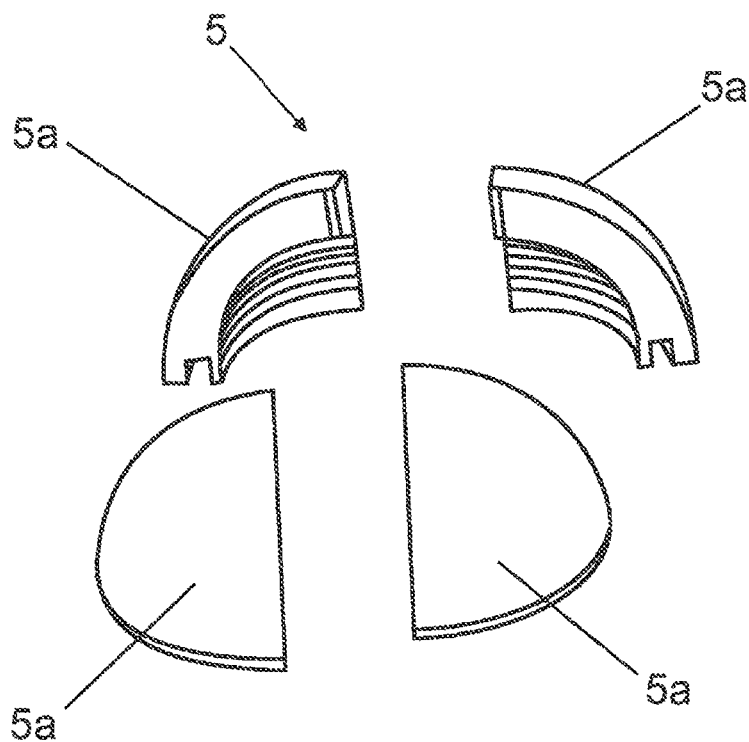

FIG. 1 is a sectional view of an LED retrofit lamp according to the present disclosure. It can be seen from the figure that the LED retrofit lamp consists of an LED lighting assembly and a lamp holder 1, wherein the LED lighting assembly has a printed circuit board 3 carrying an LED chip 4, a heat sink 2 is thermally connected with the printed circuit board 3, and the lamp holder 1 is fixedly connected on the other end of the heat sink 2 so as to form the LED retrofit lamp according to the present disclosure. It can be further seen from the figure that a bulb 5 is configured as a light guide body having an inner surface 6, an outer surface 7 as a light emergent surface and an end surface 8 as a light input coupling surface of light from the LED chip 4. The end surface 8 is supported on the printed circuit board 3 and is provided with an accommodating recess 11 in which the LED chip 4 is received. In the present embodiment, the bulb 5 is configured as a hemispherical shape with a cavity. Of course, the bulb 5 also may be configured as a hollow column, cube, pyramid or cone and is made from a glass or a plastic. Certainly, the bulb 5 also may be made from other transparent or semi-transparent materials suitable as a bulb. In addition, in the present embodiment, the bulb 5 is configured as a single part, also may be configured as separated parts of two, four or six sub bulbs 5a equally divided on a circumference of the bulb 5, and these sub bulbs 5a are combined to be bonded or welded together (see FIG. 5A-FIG. 5B).

It can be seen from FIG. 1 that the inner surface 6 is structured to form reflecting surfaces 10 towards the outer surface 7. At least part of light from the end surface 8 is reflected by the reflecting surfaces 10 and then exits through the outer surface 7. In addition, a reflecting cover 12 closely neighboring the inner surface 6 is arranged in an inner side of the bulb 5. Remainder light from the end surface 8 is reflected by the reflecting cover 12 and then exits through the outer surface 7.

Besides, as further seen from FIG. 1, the printed circuit board 3 has an excavated central region and a peripheral region arranged with the LED chip 4. The heat sink 2 is provided with a hollow region communicated with the central region of the printed circuit board 3 so that the bulb 5 and the heat sink 2 jointly define a relatively big installation space to accommodate electronic devices such as LED driver.

Figure 2:
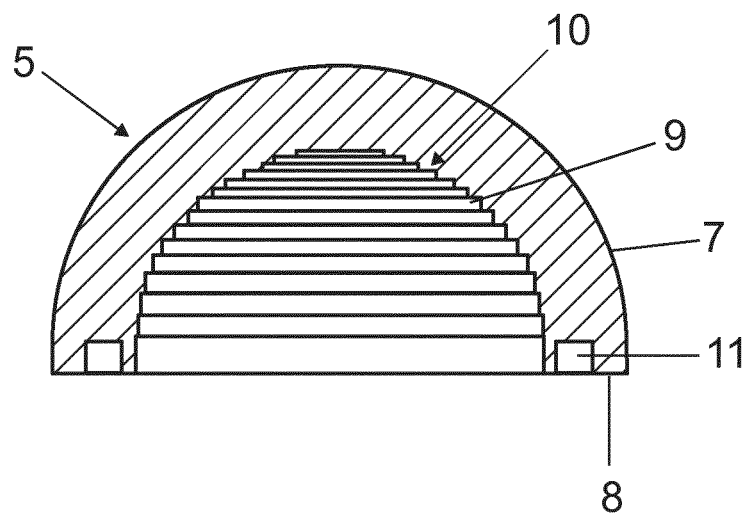
FIG. 2 is a schematic diagram of a bulb of an LED lighting assembly according to the present disclosure.

FIG. 2 is a schematic diagram of the bulb 5 of the LED lighting assembly according to the present disclosure. It can be seen from FIG. 2 that a plurality of annular grooves 9 are provided in sequence on the inner surface 6. The annular grooves 9 are spaced apart in predetermined intervals in a direction from the end surface 8 to a top of the bulb 5, and a plane defined by each annular groove 9 is parallel to a plane defined by the end surface 8. Particularly, a cross section of the annular groove 9 is in a V shape, and the reflecting surface 10 is constructed by two groove side surfaces in a V shape of the annular groove 9. It can be seen from the figure that an interval between the annular grooves 9 gradually gets smaller in the direction from the end surface 8 to the top of the bulb 5. Besides, an angle between two groove side surfaces of each annular groove 9 is in a range of 60° to 120°, wherein the bulb 5 is divided in the direction from the end surface 8 to the top of the bulb 5 into a bottom area, a middle area and a top area, and wherein an angle between two groove side surfaces of the annular groove 9 in the bottom area, middle area and top area is 120°-110°, 110°-80°, and 80°-60°, respectively. As the distance from the annular groove 9 to the LED chip gets bigger, the angle between two groove side surfaces of each annular groove 9 gets smaller, so as to obtain a predetermined illuminating angle range by selecting different angle ranges.

Figure 3:
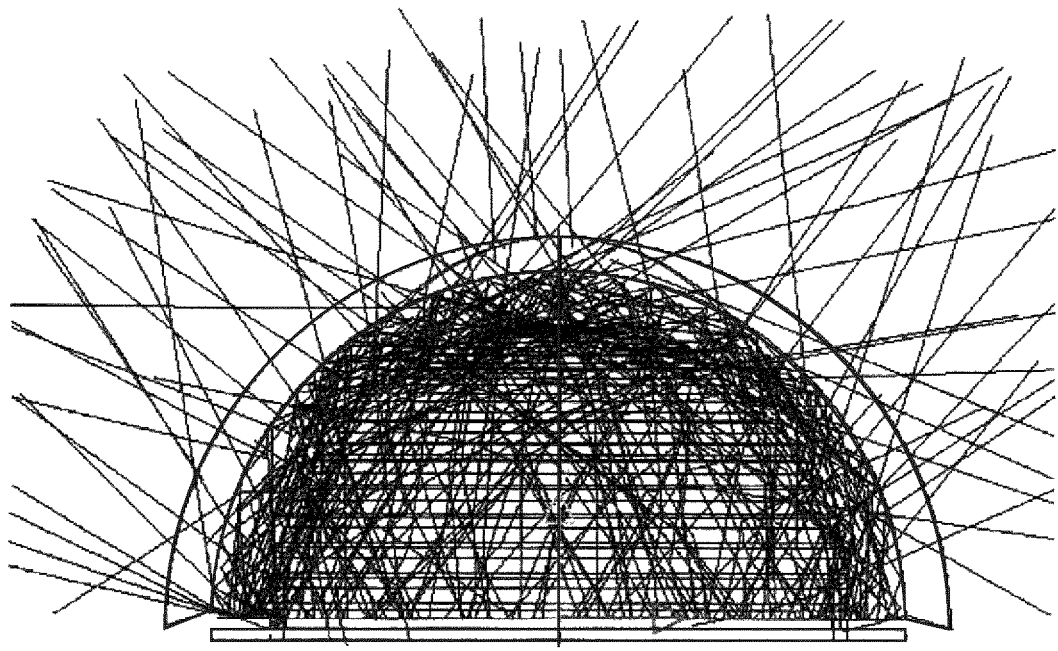
FIG. 3 is a light path map of reflection of light in a bulb.

FIG. 3 is a light path map of reflection of light in the bulb 5. As seen from the figure, light reflected by the reflecting surfaces 10 in the bulb 5 exits uniformly from the outer surface 7 of the bulb 5, so as to obtain quite good light intensity distribution performance.

Figure 4A:
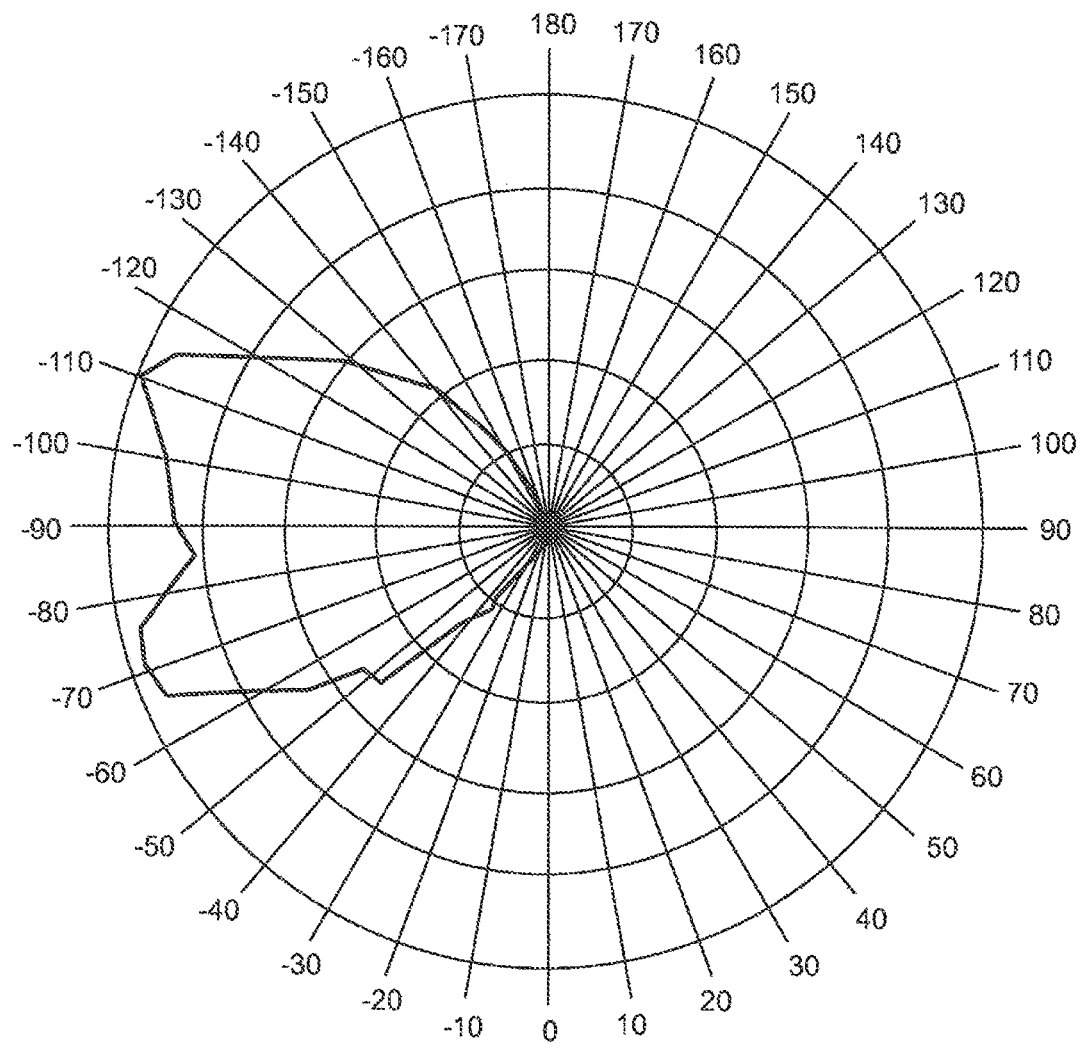
FIG. 4A-FIG. 4C are curve diagrams of light intensity of the LED lighting assembly according to the present disclosure.
Figure 4B:
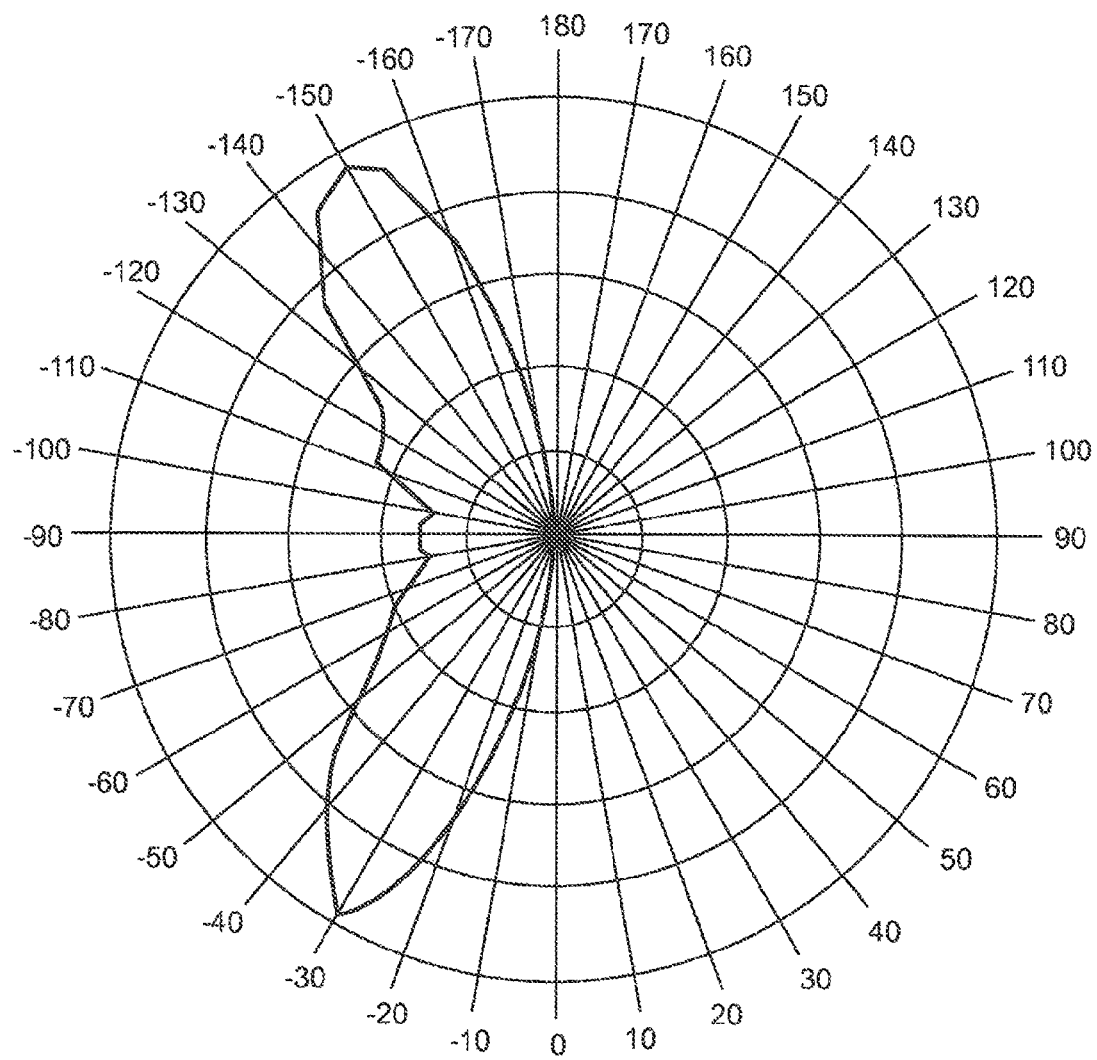
Figure 4C:
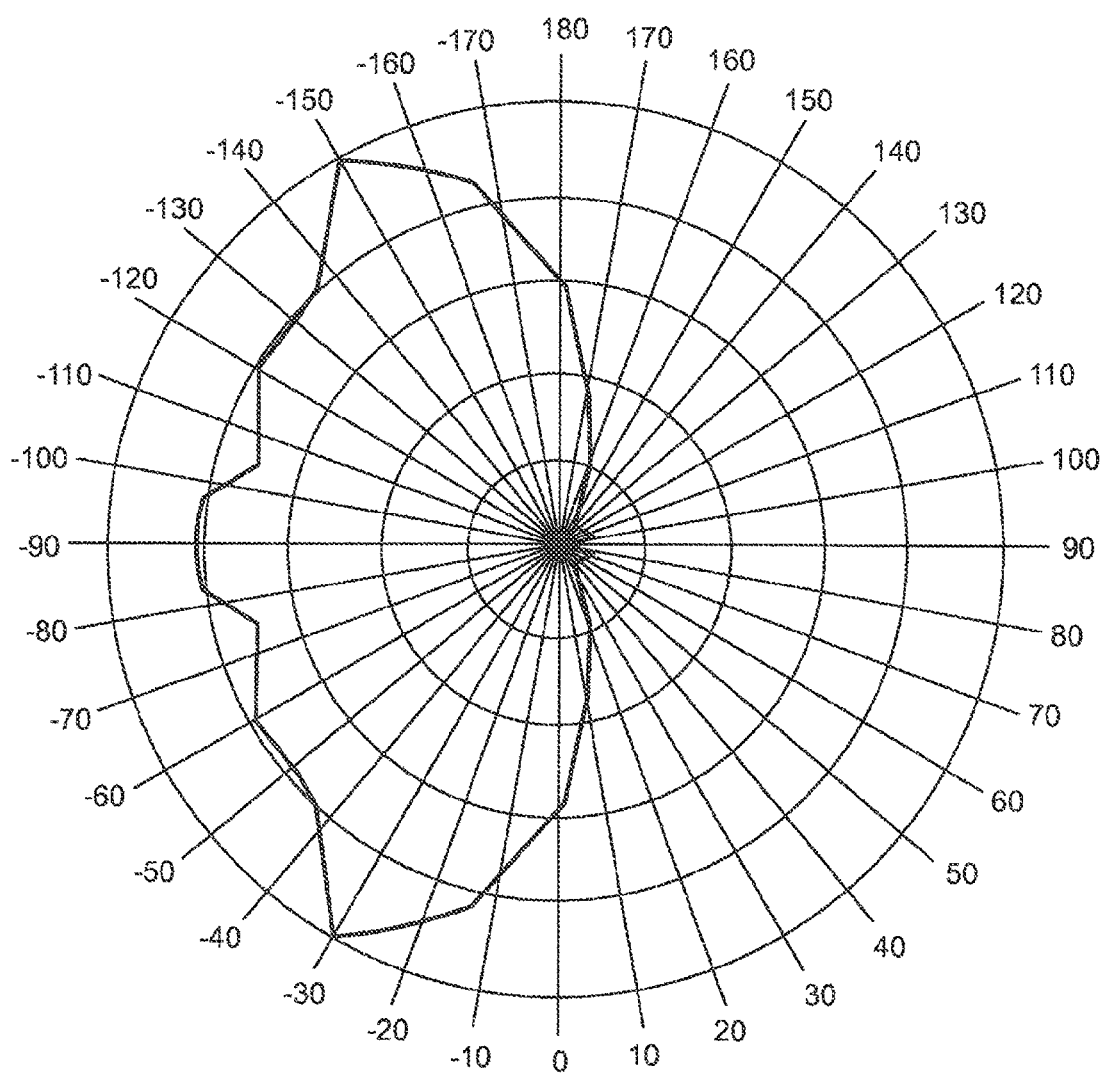

FIG. 4A-FIG. 4C are curve diagrams of light intensity of the LED lighting assembly according to the present disclosure. As seen from the figure, the LED lighting assembly according to the present disclosure may obtain different illuminating angle ranges by adjusting a density of arranging the annular grooves 9 and the angle between two groove side surfaces in a V shape of the annular groove 9, i.e. by adjusting an emergent angle of the light; moreover, the light intensity distribution is also relatively uniform in each illuminating angle range. Particularly, FIG. 4A shows an illuminating angle range of 90°, FIG. 4B shows an illuminating angle range of 150°, and FIG. 4C shows an illuminating angle range of 180°.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 1 lamp holder
2 heat sink
3 printed circuit board 4 LED chip
5 bulb
5a sub bulb
6 inner surface
7 outer surface
8 end surface
9 annular groove
10 reflecting surface
11 accommodating recess
12 reflecting cover

The invention claimed is:

1. An LED lighting assembly, comprising:
a printed circuit board with an LED chip, and
a heat sink thermally conducted with the printed circuit board,
wherein the LED lighting assembly further comprises a light guide body configured as a bulb, the light guide body having an end surface as a light incidence surface of light from the LED chip, an outer surface as a light emergent surface and an inner surface, wherein the inner surface is structured so as to form a reflecting surface, reflecting at least part of light from the end surface to the outer surface,
wherein a plurality of annular grooves are provided on the inner surface, the annular grooves are spaced apart in a direction from the end surface to a top of the bulb.

2. The LED lighting assembly according to claim 1, wherein a cross section of the annular groove is in a V shape, and the reflecting surface is defined by two groove side surfaces of the V shape-annular groove, wherein the reflecting surface faces the outer surface.

3. The LED lighting assembly according to claim 2, wherein a plane defined by the surface of each annular groove is parallel to a plane defined by the end surface.

4. The LED lighting assembly according to claim 1, wherein the end surface is supported on the printed circuit board, and is provided with an accommodating recess in which the LED chip is received.

5. An LED lighting assembly, comprising:
a printed circuit board with an LED chip, and
a heat sink thermally conducted with the printed circuit board,
wherein the LED lighting assembly further comprises a light guide body configured as a bulb, the light guide body having an end surface as a light incidence surface of light from the LED chip, an outer surface as a light emergent surface and an inner surface, wherein the inner surface is structured so as to form a reflecting surface, reflecting at least 13part of light from the end surface to the outer surface,
wherein a plurality of annular grooves are provided on the inner surface, the annular grooves are spaced apart in a direction from the end surface to a top of the bulb, and
wherein an interval between the annular grooves in a direction from the end surface to a top of the bulb gradually become smaller.

6. The LED lighting assembly according to claim 2, wherein an angle between two groove side surfaces of each annular groove is in a range of 60° to 120°.

7. The LED lighting assembly according to claim 6, wherein the bulb is divided in a direction from the end surface to a top of the bulb into a bottom area, a middle area and a top area, and wherein an angle between two groove side surfaces of the annular groove in the bottom area, the middle area and the top area is 120°-110°, 110°-80°, and 80°-60°, respectively.

8. The LED lighting assembly according to claim 1, wherein the LED lighting assembly further comprises an additional reflecting cover neighboring the inner surface in an inner side of the bulb.

9. The LED lighting assembly according to claim 1, wherein the printed circuit board has an empty central region and a peripheral region arranged with the LED chip.

10. The LED lighting assembly according to claim 9, wherein the heat sink is provided with a hollow region extending up to the empty central region.

11. The LED lighting assembly according to claim 1, wherein the bulb is configured to be a hollow hemispherical shape or a hollow column, cube, pyramid or cone.

12. The LED lighting assembly according to claim 1, wherein the bulb consists of two, four or six sub bulbs equally divided on a circumference of the bulb.

13. The LED lighting assembly according to claim 12, wherein the sub bulbs are bonded or welded together.

14. The LED lighting assembly according to claim 1, wherein the bulb is made from a glass or a plastic.

15. An LED retrofit lamp, wherein the LED retrofit lamp has a lamp holder and a LED lighting assembly, the LED lighting assembly, comprising a printed circuit board with an LED chip, and a heat sink thermally conducted with the printed circuit board, wherein the LED lighting assembly further comprises a light guide body configured as a bulb, the light guide body having an end surface as a light incidence surface of light from the LED chip, an outer surface as a light emergent surface and an inner surface, wherein the inner surface is structured so as to form a reflecting surface, reflecting at least part of light from the end surface to the outer surface, and the lamp holder is fixed on the heat sink of the LED lighting assembly to connect the LED lighting assembly to a power supply, wherein a plurality of annular grooves are provided on the inner surface, the annular grooves are spaced apart in a direction from the end surface to a top of the bulb.

\* \* \* \* \*

UNITED STATES PATENT AND TRADEMARK OFFICE
CERTIFICATE OF CORRECTION

PATENT NO. : 9,255,667 B2  Page 1 of 1
APPLICATION NO. : 14/236344
DATED : February 9, 2016
INVENTOR(S) : Qihui Zhang et al.

It is certified that error appears in the above-identified patent and that said Letters Patent is hereby corrected as shown below:

In the Specification

Column 5, line 2: Please write "4" between the words "chip" and "gets".

In the Claims

Column 6, line 20: Please delete "13" between the words "least" and "part".

Signed and Sealed this
Thirty-first Day of May, 2016

Michelle K. Lee
*Director of the United States Patent and Trademark Office*